United States Patent
Fischer et al.

(10) Patent No.: US 8,368,780 B2
(45) Date of Patent: Feb. 5, 2013

(54) DETERMINATION OF THE FIXED PATTERN NOISE DURING THE OPERATION OF A CAMERA

(75) Inventors: Marc Fischer, Nonnenhorn (DE); Christoph Wiedemann, Wasserburg (DE)

(73) Assignee: Continental Automotive GmbH, Hannover (DE)

( * ) Notice: Subject to any disclaimer, the term of this patent is extended or adjusted under 35 U.S.C. 154(b) by 667 days.

(21) Appl. No.: 12/519,807

(22) PCT Filed: Dec. 4, 2007

(86) PCT No.: PCT/EP2007/063251
§ 371 (c)(1),
(2), (4) Date: Jun. 18, 2009

(87) PCT Pub. No.: WO2008/074629
PCT Pub. Date: Jun. 26, 2008

(65) Prior Publication Data
US 2010/0039540 A1 Feb. 18, 2010

(30) Foreign Application Priority Data
Dec. 19, 2006 (DE) .......................... 10 2006 060 001

(51) Int. Cl.
*H04N 5/217* (2011.01)
*H04N 9/64* (2006.01)
(52) U.S. Cl. ...................................... 348/241; 348/243
(58) Field of Classification Search .................. 348/241, 348/243, 246, 254
See application file for complete search history.

(56) References Cited

U.S. PATENT DOCUMENTS

| | | | |
|---|---|---|---|
| 5,926,216 A | 7/1999 | Nobuoka | |
| 6,075,903 A | 6/2000 | Breiter et al. | |
| 7,280,141 B1 * | 10/2007 | Frank et al. | 348/243 |
| 2005/0073596 A1 * | 4/2005 | Takahashi | 348/241 |
| 2005/0259166 A1 * | 11/2005 | Tsuda et al. | 348/241 |

FOREIGN PATENT DOCUMENTS

| | | |
|---|---|---|
| DE | 19715983 C1 | 9/1998 |
| DE | 10055862 A1 | 5/2002 |
| EP | 1601185 A2 | 11/2005 |

(Continued)

OTHER PUBLICATIONS

Breiter et al.: "Recent developments of QWIP IR imaging modules at AIM", SPIE Conference on Infrared Detectors and Focal Plane Arrays V, Orlando, Florida, Apr. 1998. Proc. SPIE, vol. 3379 (1998), pp. 423-432.

(Continued)

*Primary Examiner* — Kelly L Jerabek
(74) *Attorney, Agent, or Firm* — Laurence A. Greenberg; Werner H. Stemer; Ralph E. Locher

(57) ABSTRACT

A fixed pattern noise of an image converter is automatically determined. A first optical image is converted using the image converter into digital image data, the light level of the first optical image is determined, the light level of the first optical image is compared with a threshold value, and the image converter characteristics of the image converter are reset to a dark image setting in such a way that the image data generated over the photosensitive imaging surface of the image converter at constant distribution of the determined light level include no component produced by the light level. Immediately thereafter, using the dark image setting previously set, a first dark image is recorded.

11 Claims, 2 Drawing Sheets

FOREIGN PATENT DOCUMENTS

WO    2004021696 A1    3/2004

OTHER PUBLICATIONS

Scribner et al.: Nonuniformity correction for staring IR focal plane arrays using scene-based techniques. SPIE Conference on Infrared Detectors and Focal Plane Arrays. Proc. SPIE, vol. 1308 (1990), pp. 224-233.

Wallrabe et al.: "Nachtsichttechnik", Braunschweig, Wiesbaden, Germany; Vieweg, 2001, Kapitel 6: Signalverarbeitung and Bilddarstellung; Unterkapitel 6.1: Inhomogenitatskorrektur, pp. 339-364—Statement of Relevance.

Harris et al.: Minimizing the "Ghosting" Artifact in Scene-based Nonuniformity Correction; SPIE Conference on Infrared Imaging Systems: Design, Analysis, Modeling and Testing IX, Orlando, Florida, Apr. 1998; Proc. SPIE vol. 3377 (1998), pp. 106-113.

Torle et al.: "Scene-based correction of image sensor deficiencies" Infrared Technology and Applications XXIX, Proceedings of SPIE vol. 5074, 2003, pp. 249-260.

* cited by examiner

DETERMINATION OF THE FIXED PATTERN NOISE DURING THE OPERATION OF A CAMERA

BACKGROUND OF THE INVENTION

Field of the Invention:

The invention relates to the determination of a fixed noise structure which overlays the images captured using an image converter.

Digital image converters are used for the automated conversion of an optical image into digital image data which represents the optical image. Corresponding image converters are frequently also referred to as image sensors. Since the conversion properties of conventional image sensors are as a rule not ideal, the images represented in the digital image data generally exhibit differences from the optical images on which they are based. These differences are referred to as image errors.

Differences in the properties of the sensors for individual image points are for the most part the cause of the so-called "fixed pattern noise", a fixed noise structure which, regardless of subject, overlays all the image data generated by the respective image sensor and as a result may have a detrimental effect on possibly following image processing methods. An improvement in the image quality can therefore be achieved by subtracting the fixed pattern noise from the digital image data, similar to a foreign or reference image.

To this end, the fixed pattern noise of the particular image converter must however be known. At the present time, in order to ascertain the fixed pattern noise of an image converter, the latter is used to record a dark image whose image data contains the fixed pattern noise and an offset which is constant for all image element sensors of the image converter. The offset corresponds to the average value of all the image element values. Finally, the correction values for the digital image data can be ascertained from the image data for the dark image, preferably captured at a high amplification setting for the image converter. At the present time, the ascertainment of the fixed pattern noise is carried out towards the end of the image converter manufacturing process as an additional production step. On the one hand, a lightproof covering of the photosensitive surface of the image converter is required in this situation, and on the other hand the correction values based on the fixed pattern noise must be accessibly stored in a data memory associated with the image converter if an image data correction is to be possible during operation of the image sensors. The separate determination of the fixed pattern noise prior to a commissioning of the image converter signifies additional costs associated with an increased logistical resource requirement.

BRIEF SUMMARY OF THE INVENTION

In the international patent application WO 2004/021696 A1 a method is disclosed for reducing the fixed pattern noise (FNP) portion in images which have been captured using an image sensor (so-called original images). Three methods are described for the determination of the FNP.

In the first method, the image sensor is subjected in an integrating sphere to levels of illumination of different intensity but homogeneous (in other words without local variations). For each of the levels of illumination the gray values of the individual image sensor elements are ascertained. The gray values of all image sensor elements at one of the levels of illumination form a correction pattern. The correction patterns captured at different levels of illumination together form a so-called correction pattern field. For the purpose of brightness adaptive FNP correction of an original image captured with the image sensor, a synthetic correction pattern which is matched to the brightness values (gray values) of the individual image points of the original image is ascertained from the correction pattern field.

For the second method, it is assumed that each element of the image sensor exhibits the same characteristic type, but that the characteristics of the individual image sensor elements differ from one another in their parameterization. The determination of the individual characteristic parameters ensues from the correction pattern field generated as described above, whereby only the parameters are subsequently saved in order to save storage space.

In the case of the third method, instead of ascertaining the correction pattern field by measurement techniques a chronological averaging by image sensor element of N chronologically earlier camera images is used in a separate calibration operation. It is also possible to use a chronological lowpass filter (filtering takes place per image sensor element). The spatial average value is subtracted from the result image for the chronological filtering (or a spatial highpass filter is used) and used as a synthetic correction pattern. The brightness adaptive image correction is then carried out with this synthetic correction pattern. A correction pattern field can be determined by evaluating many chronologically earlier and stored synthetic correction patterns.

An image recording device, in which an improved signal-to-noise ratio is achieved, is disclosed in patent specification U.S. Pat. No. 5,926,216. The improvement is achieved in that four successive images in each case are recorded and then added, in other words integrated to all intents and purposes. In order to improve the result, the position of the optical image on the image sensor is shifted between the four successive images. In one of the embodiments described, this integration of a plurality of image recordings to form a composite image is then applied if the luminance of the optical image converted by the image sensor falls beneath a threshold value.

In the published patent application EP 1 601 185 A2 an electronic camera is disclosed whereby a dark image is recorded for determining the FNP. In order to capture the dark image the camera is operated with its shutter closed. Since the image data for the dark image thus generated consists of three components, namely FNP, white noise and dark current offset, the components to be associated with the dark current and the white noise are determined first. The dark current component results from the average value of the pixel values beneath a particular threshold value, which can be predefined or can be ascertained by means of smoothing. After subtraction of the dark current portion, only the values above a further threshold are used for determining the FNP.

On this basis, the object of the invention is therefore to set down a method and a device which enable an automatic determination of the fixed pattern noise of an image converter during its operation and without a major technical resource requirement.

The object is achieved in accordance with the independent claims of the invention.

The invention comprises a method for determining the fixed pattern noise of an image converter, whereby the method has steps for converting a first optical image into digital image data using the image converter in order to determine the light level for the first optical image, to compare the light level determined for the first optical image with a threshold value, to adapt the image converter properties of the image converter to a dark image setting such that the image data generated in the case of an even distribution of the determined light level over the photosensitive imaging surface of the image converter does not include any component produced by the light level, and to record a first dark image with the previously set dark image setting.

In this context it should be noted that the terms "comprise", "have", "include", "contain" and "with", and any grammatical variations thereof, used in this description and the claims for listing features generally specify the presence of features, such as for example method steps, facilities, ranges, variables and so forth, but in no way exclude the presence of other or additional features or groups of other or additional features.

The invention furthermore includes a device for determining the fixed pattern noise of an image converter which is designed for converting an optical image into digital image data. The device comprises an image capture control unit for controlling the image converter, an image processing unit for processing the digital image data generated by the image converter and an image data storage unit for storing digital image data. In this situation, the image processing unit is designed to ascertain the light level contained in an optical image from the associated digital image data. The image capture control unit is designed to control the setting of the image converter such that the image data generated in the case of an even distribution of the determined light level over the photosensitive imaging surface of the image converter does not include any component produced by the light level if the light level ascertained by the image processing unit is less than or equal to a threshold value.

Lastly, the invention comprises a computer program product for determining the fixed pattern noise of an image converter, whereby the computer program product has a series of physically distinguishable states which can be read and executed by a data processing unit and represent a sequence of instructions which when executed on the data processing system perform a method corresponding to the method according to the invention and set up a device according to the invention on the data processing system.

The invention enables the determination of the fixed pattern noise of an image converter while it is being used as intended. It is thus possible to dispense with an elaborate determination, preceding the use of the image converter, of the fixed pattern noise and the latter's disclosure for improving the image quality of image converter systems which use the image converter. This signifies considerable savings with regard to the large-scale production of image converter systems.

The invention is developed in its dependent claims.

In order to minimize negative influences of large differences in brightness in the optical image and to obtain a dark image corresponding to the ideal dark image at least one further dark image analogous to the first dark image is recorded and the digital image data for the image elements of the first dark image is replaced by the digital image data for the image elements of the further dark image, if the latter has a lower value, corresponding to the respective image elements of the first dark image.

In order that possible brightness concentrations are not always located at the same positions of the optical image, the subject of the optical image underlying the first dark image advantageously differs from the subject of the optical image underlying the at least further dark image.

Better statistics on the distribution of the differences in brightness in the further dark images can be obtained if the subject of the optical image underlying a first further dark image differs in each case from the subject of the optical image underlying a different further dark image.

The noise structure determined from the fixed pattern noise of the image converter is advantageously isolated from the dark image in that the average value of the digital image data for the first dark image is determined and is subtracted from the digital image data for the first dark image.

The image capture control unit, image processing unit and image data storage unit of the device for determining the fixed pattern noise are advantageously designed in such a manner that they perform the described method steps.

Further features of the invention are set down in the description which follows of exemplary embodiments according to the invention in conjunction with the claims and also the figures. With regard to an embodiment according to the invention, the individual features may be implemented individually in each case or in a plurality. Several exemplary embodiments of the invention are described in the following with reference to the accompanying figures. In the drawings:

DESCRIPTION OF THE INVENTION

The fixed pattern noise of an image converter can be ascertained from a dark image which has been recorded with the image converter. In the ideal situation the dark image already corresponds to the fixed pattern noise, overlaid with an offset, of the image converter. In contrast to a factory determination of the fixed pattern noise or outside of an intended use of the image sensors the photosensitive surface of the image converter cannot be covered in lightproof fashion during normal operation. The dark image is therefore only recorded during image conversion operation in the situation if the incident light intensity reaching the image converter falls below a predefined value. In this situation, the recording of the dark image itself takes place with settings for the image converter which differ from its normal operation.

Figure 1:
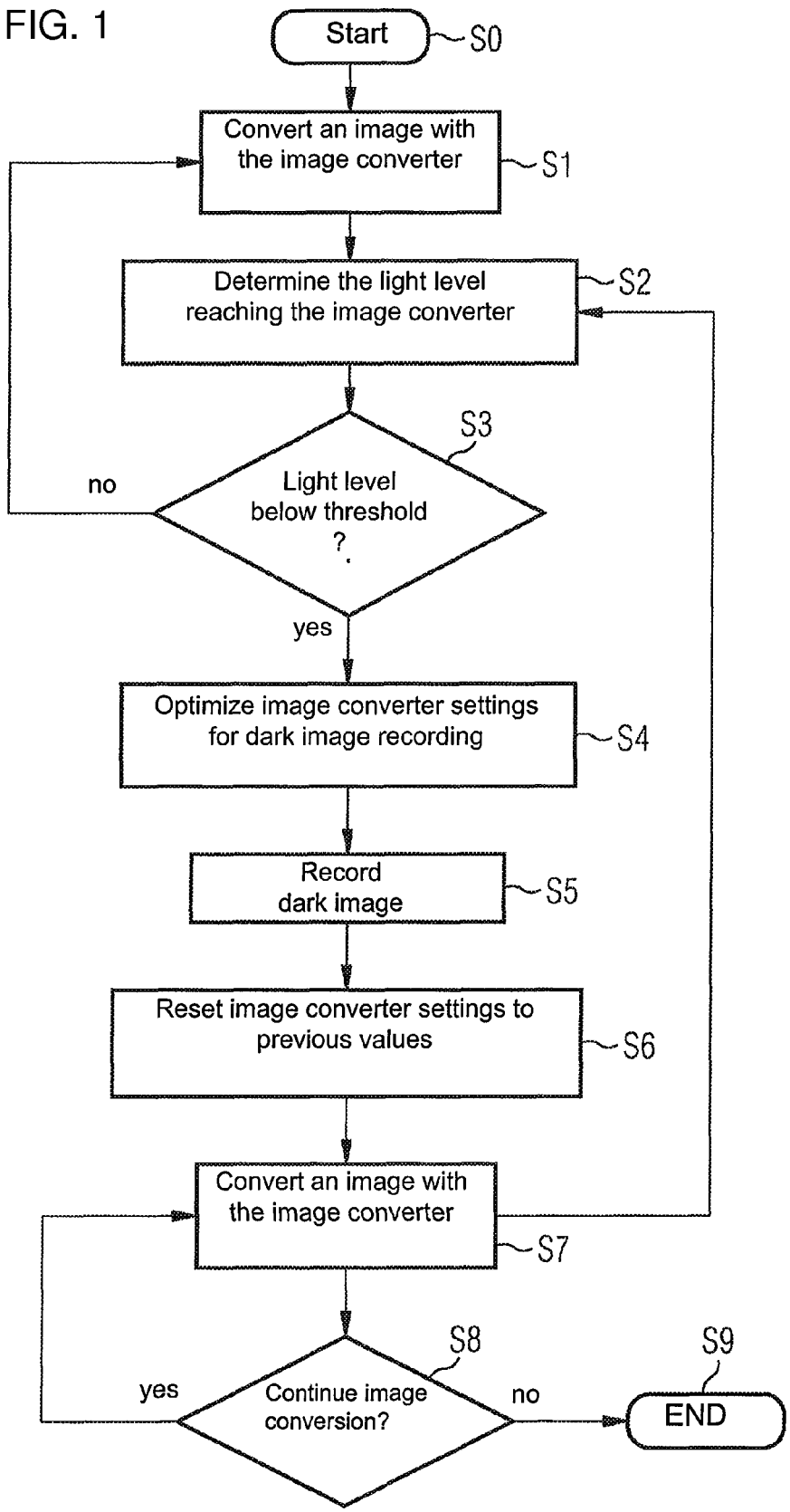
FIG. 1 shows the basic steps of a method for recording a dark image during the operation of an image converter.

This is illustrated in FIG. 1, wherein the basic steps of a method for recording a dark image during image converter operation are represented. After the start of the method in step S0, an optical image projected onto the photosensitive surface of the image converter is first converted into digital image data. The digital image data is consequently also referred to as digital image or simply also only as image. The image conversion in step S1 preferably takes place with image converter settings matched to the light situation. On the basis of the image generated in step S1, the light level projected in the form of the optical image onto the light-sensitive surface of the image converter is determined. This takes place whilst taking into account the sensitivity characteristic—which can possibly be selected—of the image converter and the amplification factor used for the conversion.

In the subsequent step S3 the light level underlying the image is compared with a threshold value. If the determined light level lies above the threshold value, then it is not possible to record a dark image with the image converter and the method is continued in step S1 with the conversion of further images. If the light level falls short of the predefined threshold value however, then the light conditions satisfy the prerequisites for the recording of a dark image now prepared in step S4.

Before the recording of the dark image is carried out, the image converter settings are optimized in step S4 for the capture of the dark image. The optimization of the settings takes place having regard to the following criteria: high amplification factor at the lowest possible light sensitivity of the image sensors and a setting for the offset which ensures that all the values for the fixed pattern noise are situated within the value range for the possible digital image data. The low light sensitivity is set as a rule by choosing the shortest exposure time. This setting serves to ensure that the light level, defined by means of the threshold value, which falls on the photosensitive surface of the image sensor, is still not able to produce an image signal. In step S5, the dark image is finally recorded using the settings made in step S4.

After resetting the image converter settings to the values prior to the change in step S4, the method is continued in step S7 with the conversion of an optical image projected onto the image sensor. In step S8 a check is made as to whether the image conversion should be continued or terminated. In the former case the method returns to step S7, in the latter case the method is terminated in step S9.

In an ideal situation, in other words when the light level corresponding at most to the threshold value is evenly distributed over the photosensitive imaging surface of the image converter, the dark image determined in accordance with the above method already corresponds to the fixed pattern noise, overlaid with an offset, whereby the offset corresponds to the average value formed from the values of all image elements. In reality, however, significant variations from the ideal situation can arise, for example if the image converted in step S1 exhibits extreme differences in the brightness or gray values of the individual image elements. It can then be the case that even if the light level determined in step S2 drops below the threshold value from step S3, the locally uneven light distribution in the case of several image element sensors nevertheless results in a light-induced signal component in step S5. In other words, the threshold ascertained in step S3 is exceeded by several image element sensors, with the result that the current optical image during the dark image recording overlays the fixed pattern noise to a small extent.

In order to nevertheless arrive at a reliable determination of the fixed pattern noise, the steps S2 to S7 are repeated several times such that a number of dark images created independently of one another are recorded. If the value of one image element in a subsequently recorded dark image is less than in the reference dark image used for determining the fixed pattern noise, then the value of the image element in the reference dark image is replaced by the lower value of the subsequently recorded dark image. With an increasing number of dark images the differences between the reference dark image and the ideal dark image, in other words the fixed pattern noise with offset, can thus be minimized.

In a further advantageous embodiment of the invention, the minimization of the differences between the reference dark image and the ideal dark image is effected by recording a number of dark images on the basis of different image scenes during the image conversion in step S1.

Different image scenes can for example be guaranteed if the image converter moves relative to its surroundings. With regard to use in motor vehicles, this can generally be ascertainable by way of the movement of the vehicle itself. It is however also possible to use simple signals, such as for example the activation of the ignition switch, whereupon the method outlined in FIG. 1 is taken up with a minimum delay or an arbitrarily varying wait time. If methods for image evaluation are available, the dissimilarity of the scenes can also be checked by means of a correlation of the images converted in step 1 prior to the recording of a dark image in each case.

In order to be able to determine more precisely the fixed noise structure defined by the fixed pattern noise, defective image element sensors such as for example hot pixels (exhibit a non-proportional conversion of light and therefore appear brighter in the case of long exposure times) or dark pixels (pixels having a reduced sensitivity) are not taken into consideration during the ascertainment of the reference dark image.

Figure 2:
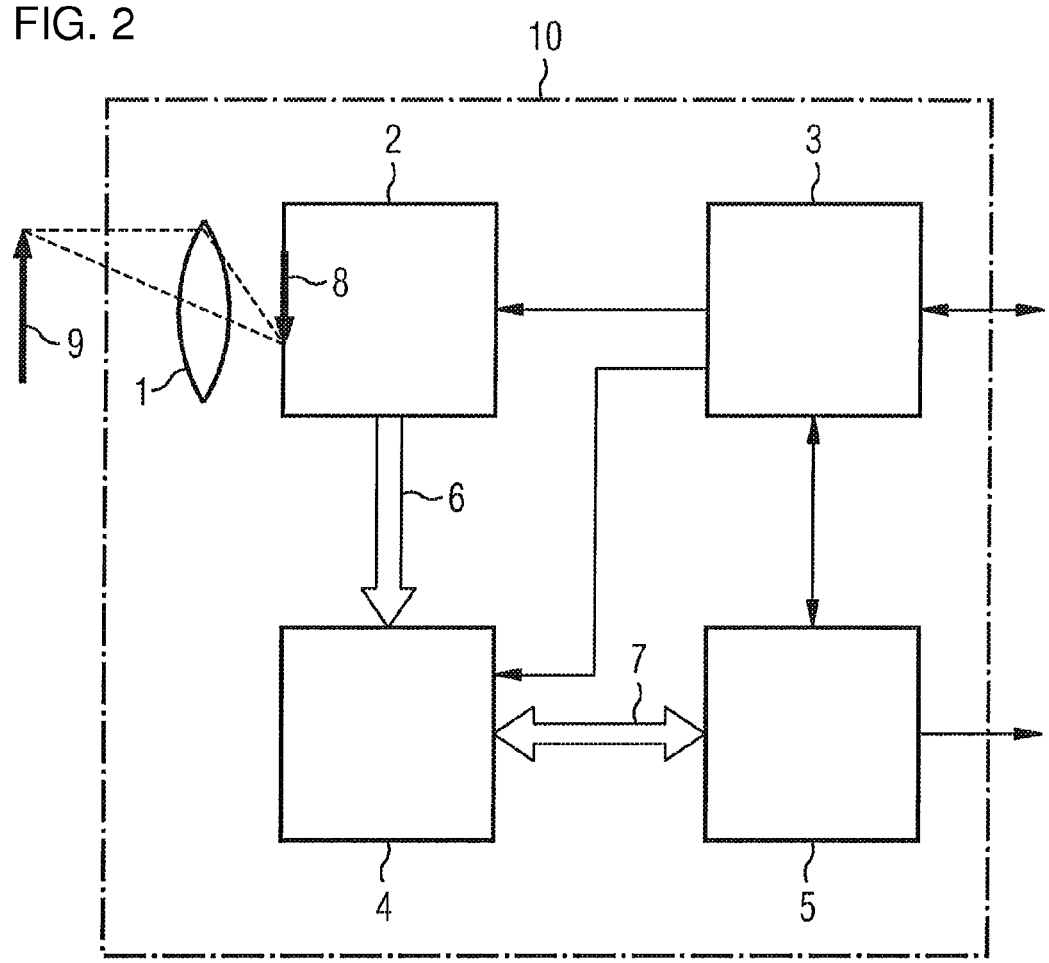
FIG. 2 shows the block diagram of a device for recording a dark image.

The block diagram of a device 10 for recording reference dark images is represented in FIG. 2. The device comprises an optical system 1 which, as indicated, projects an optical image 8 of a subject 9 or a scene 9 onto the photosensitive surface of an image converter 2 or image sensor 2. The image converter 2 converts the optical image 8 into digital image data which is transferred in the form of an image data stream by way of an image signal line 6 to an image data storage unit 4. The image data can be retrieved by the image processing unit 5 from the image data memory 4 by way of a further image signal line 7 and subjected to further processing. Storage of processed image data in the image data storage unit 4 is, as indicated in FIG. 2, possible.

Alternatively, the image data stream can also be transferred directly from the image converter 2 to the image processing unit 5, whereby the possible intermediate storage of processed image data in the image data storage unit 4 is possible. An image capture control unit 3 is provided for making the settings for the image converter and also for controlling the functional sequences within the device 10. The image capture control unit 3 has an interface for exchanging data with other facilities outside the device 10, for example driving assistance systems of a motor vehicle. The image processing unit 5 can also exchange data and data streams, such as for example image data streams, with facilities outside the device 10.

The representation in FIG. 2 depicts a purely functional structure of the device 10. In particular, the image capture control unit 3 can be designed as part of the image processing unit 5, whereby the latter can also include the image data storage unit 4. The device 10 or parts thereof can be implemented in other facilities not shown in FIG. 2. Furthermore, only those facilities which are essential for an understanding of the invention are represented in FIG. 2. With a view to a short and clear representation, the representation of further facilities which are essential for the functioning of the device or determine the latter's functional scope has been dispensed with. These facilities are nevertheless assumed to be present.

In order to determine a reference dark image, the image capture control unit 3 controls the image converter 2 in accordance with the requirements for performing one of the methods described above. The respective determinations of the light level underlying an image and the comparison with the threshold value take place in the image processing unit 5. The latter comparison can alternatively also be performed by means of the image capture control unit 3. Dark image recordings and in particular the reference dark image are stored in the image data storage unit 4. The correction of the reference dark image on the basis of subsequently recorded dark images is performed in the image processing unit 5 under the control of the image capture control unit 3. The correction of the digital image data on the basis of the fixed pattern noise ascertained from the reference dark image also takes place in the image processing unit 5.

The present invention enables the determination of the fixed pattern noise of an image converter while it is being operated as intended. In this situation, the determination of the fixed pattern noise takes place by way of a dark image recording. During this recording the image converter is exposed to only a low light irradiation and is operated at a setting at which a predominant section of the image element sensors does not respond to the incident light intensity. Possible faults occurring as a result of excessively high local light irradiations are minimized or corrected by means of multiple measurements in conjunction with the described minimum value replacement.

The invention therefore enables a use of image converters for image recording equipment, such as for example a camera system in motor vehicles, which is suitable for mass production purposes because no image converter specific correction of the fixed pattern noise needs to be performed with regard to the manufacture of the image recording equipment.

LIST OF REFERENCE CHARACTERS

1 Optical system
2 Image converter

3 Image capture control unit
4 Image data storage unit
5 Image processing unit
6 Image signal line
7 Image signal line
8 Optical image
9 Subject
10 Device for recording reference dark images
S1-S9 Method steps

The invention claimed is:

1. A method of determining a fixed pattern noise of an image converter, the method which comprises:
    converting a first optical image comprised of a multiplicity of image elements into digital image data using the image converter;
    determining a light level for the first optical image from the digital image data;
    comparing the light level determined for the first optical image with a threshold value;
    if the light level equals or falls below the threshold value, changing the settings for the image converter to a dark image setting and thereby choosing the dark image setting such that the image data generated in the dark image setting in the case of a homogeneous distribution of a light level corresponding at most to the threshold value over a photosensitive imaging surface of the image converter does not include any component produced by the light level; recording a first dark image with the image converter in the dark image setting and using the first dark image in determining the fixed pattern noise of the image converter; and
    recording at least one further dark image analogous to the first dark image and replacing the digital image data for the image elements of the first dark image by the digital image data for the image elements of the further dark image, if the further dark image has a lower value, corresponding to the respective image elements of the first dark image.

2. The method according to claim 1, which comprises choosing a subject of the optical image underlying the first dark image to differ from a subject of the optical image underlying the at least further dark image.

3. The method according to claim 2, wherein the at least one further dark image is one of a plurality of further dark images, and wherein a subject of the optical image underlying a first further dark image differs in each case from a subject of the optical image underlying a different further dark image.

4. The method according to claim 1, which comprises determining an average value of the digital image data for the first dark image and subtracting the average value from the digital image data for the first dark image.

5. A computer program product stored on a memory medium for determining a fixed pattern noise of an image converter, comprising computer-readable and computer-executable data instructions which, when executed on a data processing unit, perform the method according to claim 1.

6. The method according to claim 1, which comprises recording the first dark image with an exposure time that is shorter than an exposure time for the first optical image.

7. The method according to claim 6, which comprises recording a plurality of dark images, comparing image elements of the plurality of dark images with one another, and replacing an image element of a given dark image with a corresponding image element from a subsequently recorded dark image if the image element of the subsequently recorded image is found to be darker than the corresponding image element of the given dark image.

8. A device for determining a fixed pattern noise of an image converter configured to convert an optical image comprised of a multiplicity of image elements into digital image data, the device comprising:
    an image processing unit for processing the digital image data generated by the image converter, said image processing unit being configured to ascertain a light level contained in an optical image from the associated digital image data;
    an image data storage unit connected to said image processing unit for storing digital image data; and
    an image capture control unit for controlling the image converter, said image capture control unit being configured to change a setting of the image converter into a dark image setting if a light level ascertained by said image processing unit is less than or equal to a given threshold value, the dark image setting being chosen such that the image data generated in the dark image setting with the image converter, in the case of a homogeneous distribution of a light level corresponding at most to the threshold value over the photosensitive image area of the image converter, does not have any proportion caused by the light level, and to store the dark image generated with the dark image setting in said image data storage unit
    wherein said image capture control unit is configured to record a plurality of dark images, to compare image elements of the plurality of dark images with one another, and to replace an image element of a given dark image with a corresponding image element from a subsequently recorded dark image if the image element of the subsequently recorded image is found to be darker than the corresponding image element of the given dark image.

9. The device according to claim 8, wherein said image capture control unit, said image processing unit, and said image data storage unit are configured for performing the method according to claim 1.

10. A computer program product stored on a memory medium for determining a fixed pattern noise of an image converter, comprising computer-readable and computer-executable data instructions which, when executed on a data processing unit, set up the device according to claim 8 on the data processing system.

11. The device according to claim 8, wherein said image capture control unit is configured to set the dark image setting by choosing a shortest exposure time for obtaining the dark image.

* * * * *